(12) United States Patent
Ulrey et al.

(10) Patent No.: US 8,342,158 B2
(45) Date of Patent: Jan. 1, 2013

(54) ENGINE WITH GASEOUS AND/OR LIQUID FUEL INJECTOR

(75) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/461,591

(22) Filed: May 1, 2012

(65) Prior Publication Data

US 2012/0210981 A1    Aug. 23, 2012

Related U.S. Application Data

(63) Continuation of application No. 12/508,063, filed on Jul. 23, 2009, now Pat. No. 8,166,956.

(51) Int. Cl.
*F02M 21/02* (2006.01)
*F02M 13/00* (2006.01)

(52) U.S. Cl. ......... 123/525; 123/575; 123/577; 123/431

(58) Field of Classification Search ............. 123/525, 123/526, 575, 577, 431, 299–300; 701/103, 701/104
See application file for complete search history.

(56) References Cited

U.S. PATENT DOCUMENTS

| | | | |
|---|---|---|---|
| 4,335,697 A | 6/1982 | McLean | |
| 4,393,848 A | 7/1983 | Poehlman | |
| 4,606,322 A | 8/1986 | Reid et al. | |
| 4,742,801 A | 5/1988 | Kelgard | |
| 4,922,862 A | 5/1990 | Casacci | |
| 5,092,305 A | 3/1992 | King | |
| 5,379,740 A | 1/1995 | Moore et al. | |
| 5,411,058 A | 5/1995 | Welsh et al. | |
| 5,479,906 A | 1/1996 | Collie | |
| 5,632,253 A | 5/1997 | Paul et al. | |
| 5,755,211 A | 5/1998 | Koch | |
| 5,775,282 A | 7/1998 | Smith | |
| 5,887,799 A | 3/1999 | Smith | |
| 5,941,210 A | 8/1999 | Hill et al. | |
| 6,003,478 A | 12/1999 | Huber | |
| 6,035,837 A | 3/2000 | Cohen et al. | |
| 6,073,862 A | 6/2000 | Touchette et al. | |
| 6,101,986 A | 8/2000 | Brown et al. | |
| 6,314,940 B1 * | 11/2001 | Frey et al. | 123/431 |
| 6,382,182 B1 | 5/2002 | Green et al. | |
| 6,431,471 B2 | 8/2002 | Anzinger et al. | |
| 6,484,699 B2 | 11/2002 | Paul et al. | |
| 6,494,190 B1 | 12/2002 | Cohen | |
| 6,561,157 B2 * | 5/2003 | zur Loye et al. | 123/295 |
| 6,588,406 B2 | 7/2003 | Oprea | |
| 6,598,584 B2 | 7/2003 | Beck et al. | |
| 6,601,566 B2 | 8/2003 | Gillis et al. | |
| 6,659,071 B2 * | 12/2003 | LaPointe et al. | 123/299 |

(Continued)

*Primary Examiner* — Thomas Moulis
(74) *Attorney, Agent, or Firm* — Julia Voutyras; Alleman Hall McCoy Russell & Tuttle LLP

(57) ABSTRACT

In one example, a system for a vehicle travelling on a surface is described. The system includes an engine with a cylinder. The cylinder includes a fuel injector that is supplied with gaseous fuel and liquid fuel by a fuel delivery system. The fuel injector is mounted in the vehicle such that the fuel injector inlet faces at least partially toward the road surface. The orientation of the fuel injector enables a quick transition from liquid fuel to gaseous fuel because the gaseous fuel can rise to the injectors and be preferentially injected. Further, various approaches are described from transitioning operation between gaseous and liquid fuel injection.

17 Claims, 5 Drawing Sheets

U.S. PATENT DOCUMENTS

| | | | |
|---|---|---|---|
| 6,684,852 B2 * | 2/2004 | Wright et al. | 123/431 |
| 6,761,325 B2 | 7/2004 | Baker et al. | |
| 6,845,608 B2 | 1/2005 | Klenk et al. | |
| 6,988,492 B2 | 1/2006 | Shetley | |
| 7,028,672 B2 | 4/2006 | Glenz et al. | |
| 7,051,713 B2 * | 5/2006 | Mashiki | 123/431 |
| 7,121,254 B2 * | 10/2006 | Wickman et al. | 123/304 |
| 7,143,739 B2 * | 12/2006 | Brachert et al. | 123/295 |
| 7,178,503 B1 * | 2/2007 | Brehob | 123/304 |
| 7,278,396 B2 * | 10/2007 | Leone et al. | 123/431 |
| 7,287,492 B2 * | 10/2007 | Leone et al. | 123/1 A |
| 7,373,931 B2 | 5/2008 | Lennox et al. | |
| 7,406,955 B1 | 8/2008 | Gachik et al. | |
| 7,438,238 B2 | 10/2008 | Date et al. | |
| 7,614,385 B2 | 11/2009 | Bysveen et al. | |
| 7,627,416 B2 | 12/2009 | Batenburg et al. | |
| 7,861,696 B2 | 1/2011 | Lund | |
| 7,895,987 B2 * | 3/2011 | Mallebrein et al. | 123/299 |
| 7,913,664 B2 | 3/2011 | Williams et al. | |
| 7,913,673 B2 | 3/2011 | Vanderslice et al. | |
| 8,006,677 B2 | 8/2011 | Williams et al. | |
| 2006/0102145 A1 * | 5/2006 | Cohn et al. | 123/406.29 |
| 2007/0137611 A1 * | 6/2007 | Yu et al. | 123/304 |
| 2008/0022982 A1 * | 1/2008 | Kamiyama | 123/575 |
| 2010/0043746 A1 * | 2/2010 | Hartmann et al. | 123/299 |
| 2011/0202256 A1 | 8/2011 | Sauve et al. | |

* cited by examiner

ENGINE WITH GASEOUS AND/OR LIQUID FUEL INJECTOR

CROSS REFERENCE TO RELATED APPLICATIONS

The present application is a continuation of U.S. patent application Ser. No. 12/508,063 filed Jul. 23, 2009, the entire contents of which are incorporated herein by reference for all purposes.

FIELD

The present application relates to methods and apparatus for delivering gaseous and/or liquid fuels to a fuel injection system of an internal combustion engine.

BACKGROUND AND SUMMARY

Internal combustion engines can operate with more than one fuel type, such as gasoline and compressed natural gas (CNG), for example. A multi-fuel engine may take advantage of the properties of each fuel type to improve emissions, mileage, power, etc.

A multi-fuel engine may also be less expensive to operate as the costs of different fuels vary over time.

One class of multi-fuel engines operating with liquid and gaseous fuels provides a separate set of injection hardware for each fuel. In this way, it is possible to provide accurate injection control for each fuel type, and easily handle transitions between the different fuel types.

However, the inventors herein have recognized that while transitions between the different fuel types is relatively simple due to the duplicative hardware set-up, the transition may take a significant amount of time to effect. At one extreme, some engines stop combustion and engine rotation during the transition from one fuel type to another fuel type. Other engines may operate during the transition, but may suffer from poor emissions and increased risk of misfire. These difficulties may prevent the engine from taking full advantage of the properties of each fuel, since the cost of transitioning may exceed the savings of transitioning.

One approach to address the above issues includes an engine mounted in a vehicle with a fuel delivery system delivering gaseous fuel and liquid fuel to a fuel injector of a cylinder, such that the fuel injector inlet faces at least partially toward the road surface. The orientation of the fuel injector enables a quick transition from liquid fuel to gaseous fuel because the gaseous fuel can rise to the injectors and be preferentially injected. For example, injection of gaseous fuel by the fuel injector may begin even before the fuel rail is entirely purged of liquid fuel. In this way, it is possible to transition fuels with a reduced set of fuel injection hardware, and further improve combustibility during the transition. As such, it can be possible to enable more transitions as the engine encounters varied operating conditions. This is especially true when the engine is mounted in a vehicle, as the engine may cycle through many operating conditions as the vehicle accelerates, decelerates, and encounters varied terrain.

Furthermore, a complementary approach to address the above issues includes a method to control an engine with a fuel delivery system delivering liquid fuel to a first, direct, fuel injector of a cylinder and gaseous fuel and liquid fuel to a second fuel injector of the cylinder. The method comprises delivering liquid fuel to the first injector of the cylinder, selectively delivering liquid fuel to the second injector of the cylinder during a first condition, selectively delivering gaseous fuel to the second injector of the cylinder during a second condition, the second condition different than the first condition, and adjusting injection of the first injector when transitioning the second injector from liquid fuel to gaseous fuel and when transitioning the second injector from gaseous fuel to liquid fuel.

In this way, it is possible to compensate for the transition of fuel types in the second injector by adjusting operation of the first injector. For example, when transitioning the second injector from liquid to gaseous fuel, the injection of the second injector may cease and the injection of the first injector may be increased such that the amount of power generated by the engine is maintained entering the transition. The fuel delivery system feeding the second injector is transitioned from liquid fuel to gaseous fuel by stopping delivery of liquid fuel, starting delivery of gaseous fuel, and purging the second injector of liquid fuel with small injections by the second injector. The transition completes by decreasing injection of the first injector, resuming injection on the second injector, and completely purging the fuel rail of liquid fuel using the high pressure gaseous fuel to push liquid fuel past a float valve and through a pressure relief valve in the liquid fuel system.

As another example, when transitioning the second injector from gaseous to liquid fuel, the injection of the second injector may cease and the injection of the first injector may be increased such that the amount of power generated by the engine is maintained entering the transition. The fuel delivery system feeding the second injector is transitioned from gaseous fuel to liquid fuel by stopping delivery of gaseous fuel, starting delivery of liquid fuel, and purging the second injector of gaseous fuel with small injections by the second injector. The transition completes by decreasing injection of the first injector when resuming injection on the second injector.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
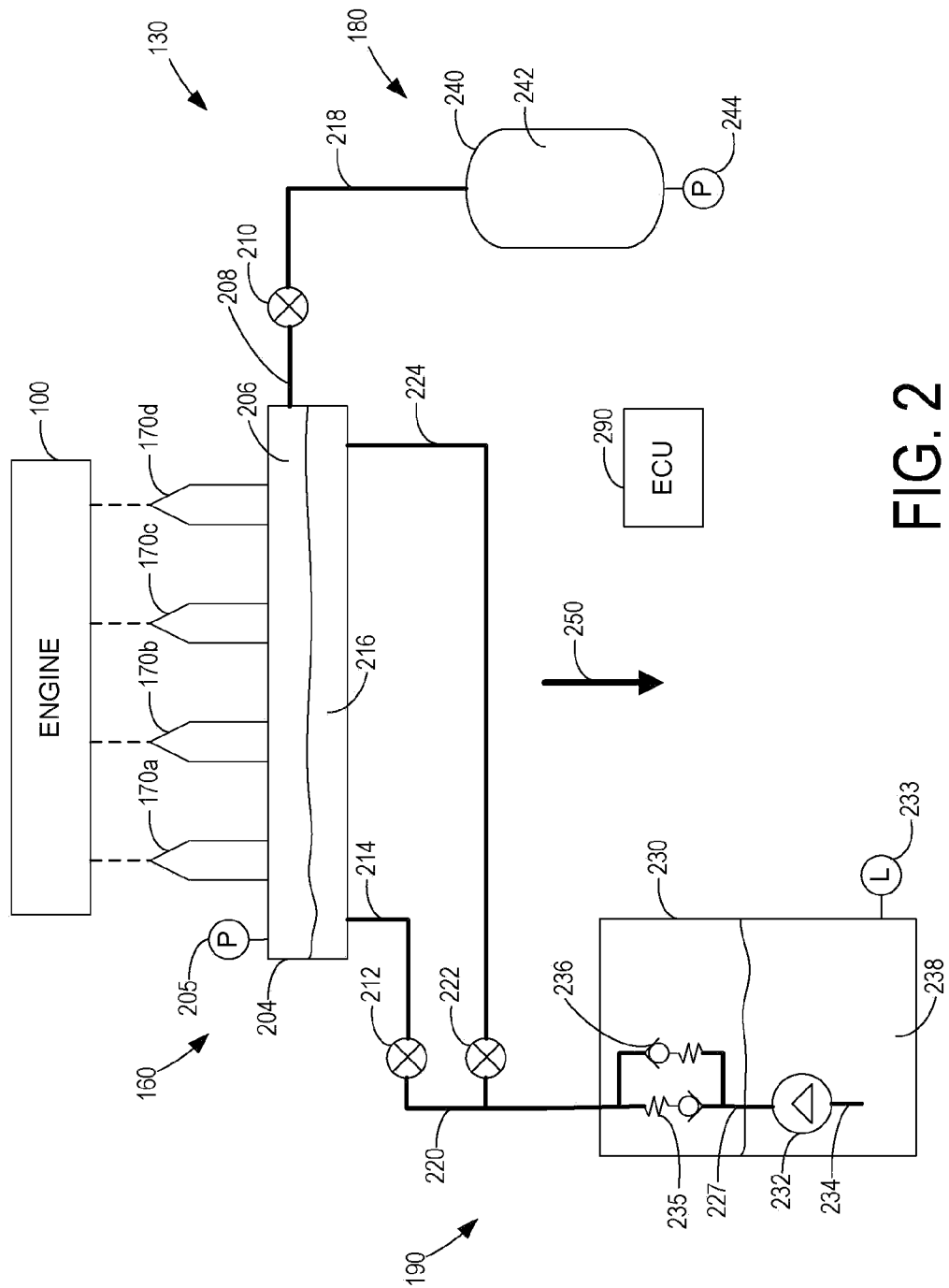
FIG. 2 shows a fuel delivery system including a single fuel rail for delivering liquid fuel and gaseous fuel.
Figure 3:
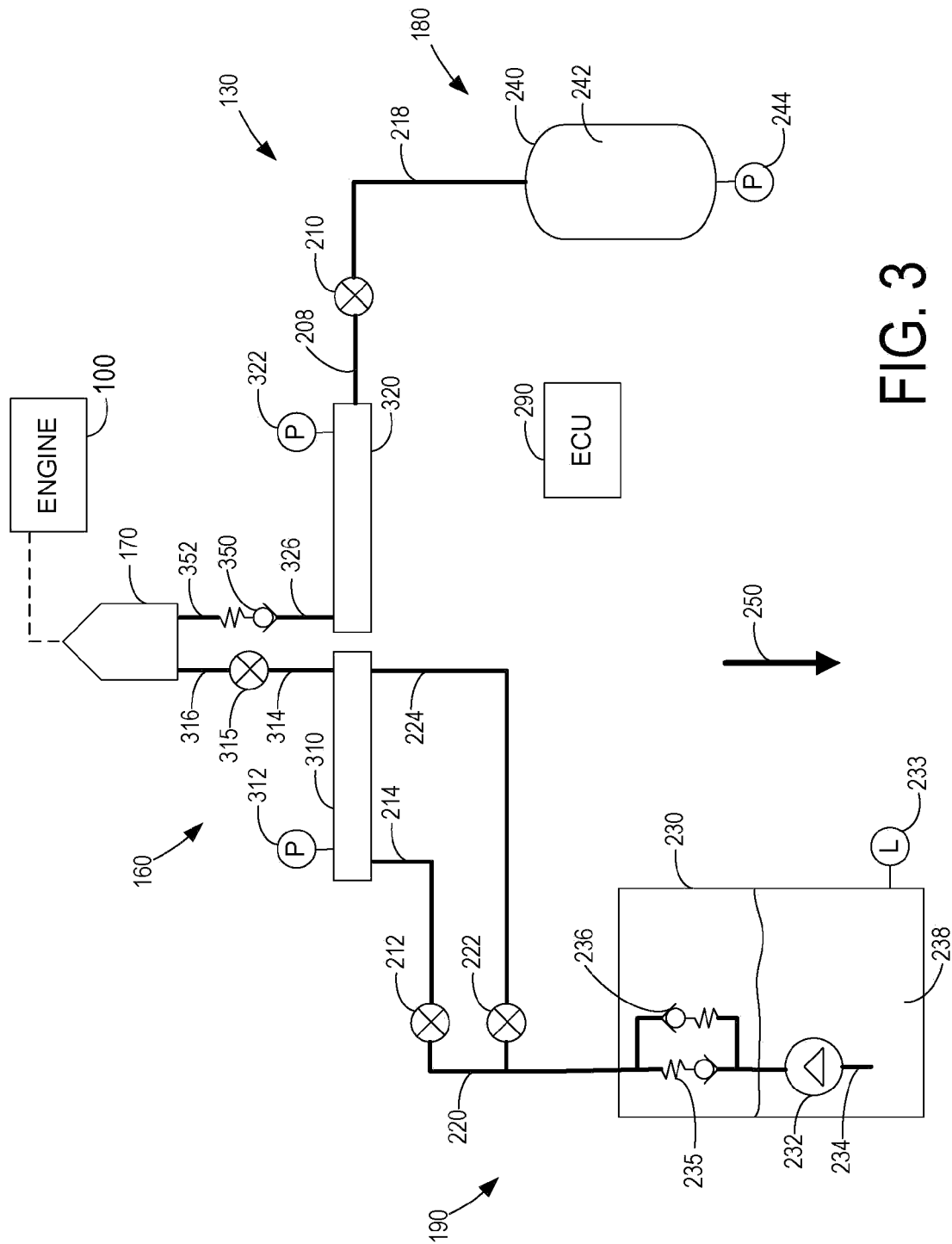
FIG. 3 shows a fuel delivery system including a liquid fuel rail and a gaseous fuel rail.
Figure 4:
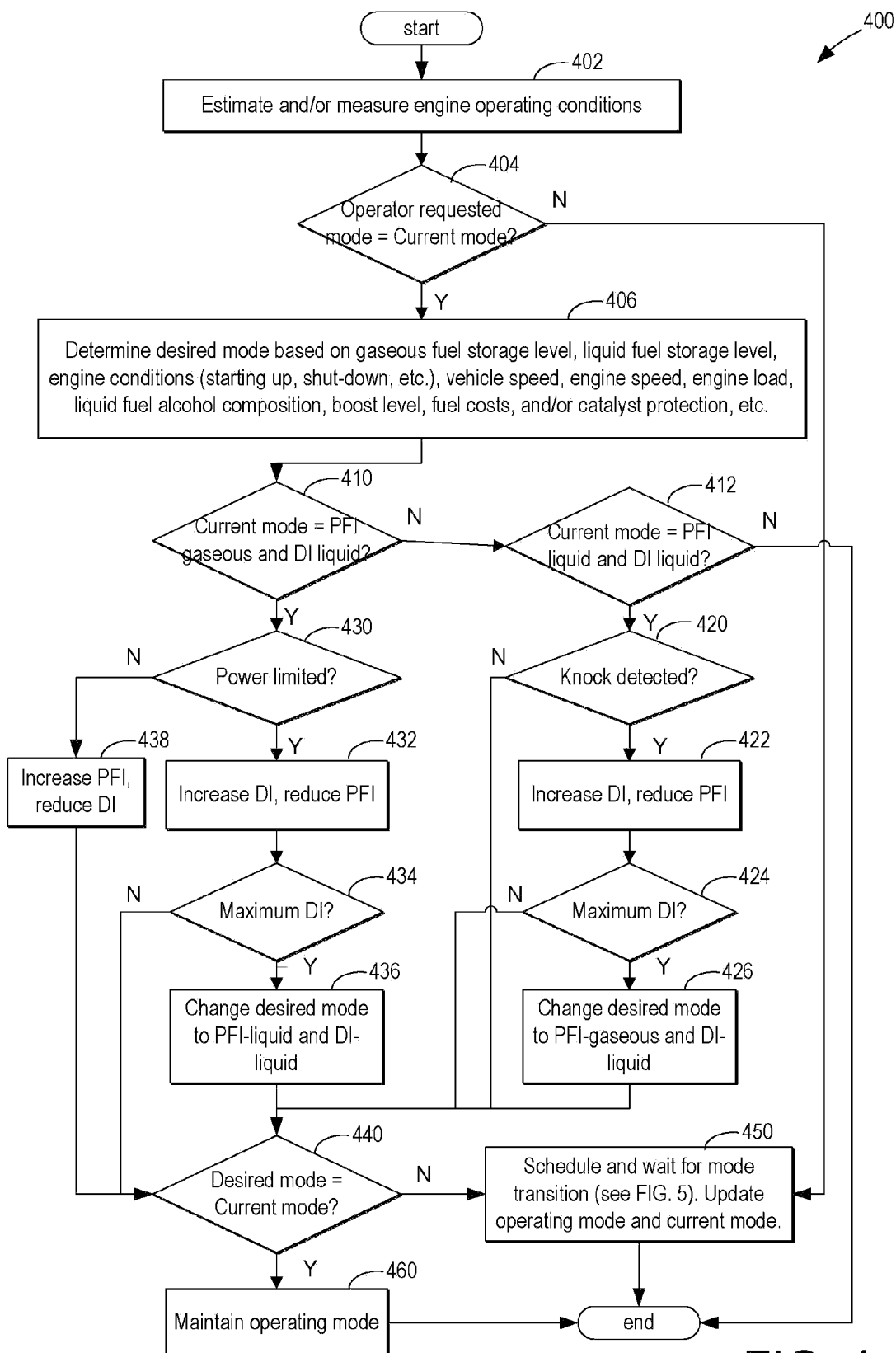
FIG. 4 shows a high level flow chart for adjusting the liquid fuel injection rate on a first injector and selectively delivering one of liquid fuel and gaseous fuel to a second injector under selected conditions according to the present disclosure.
Figure 5:
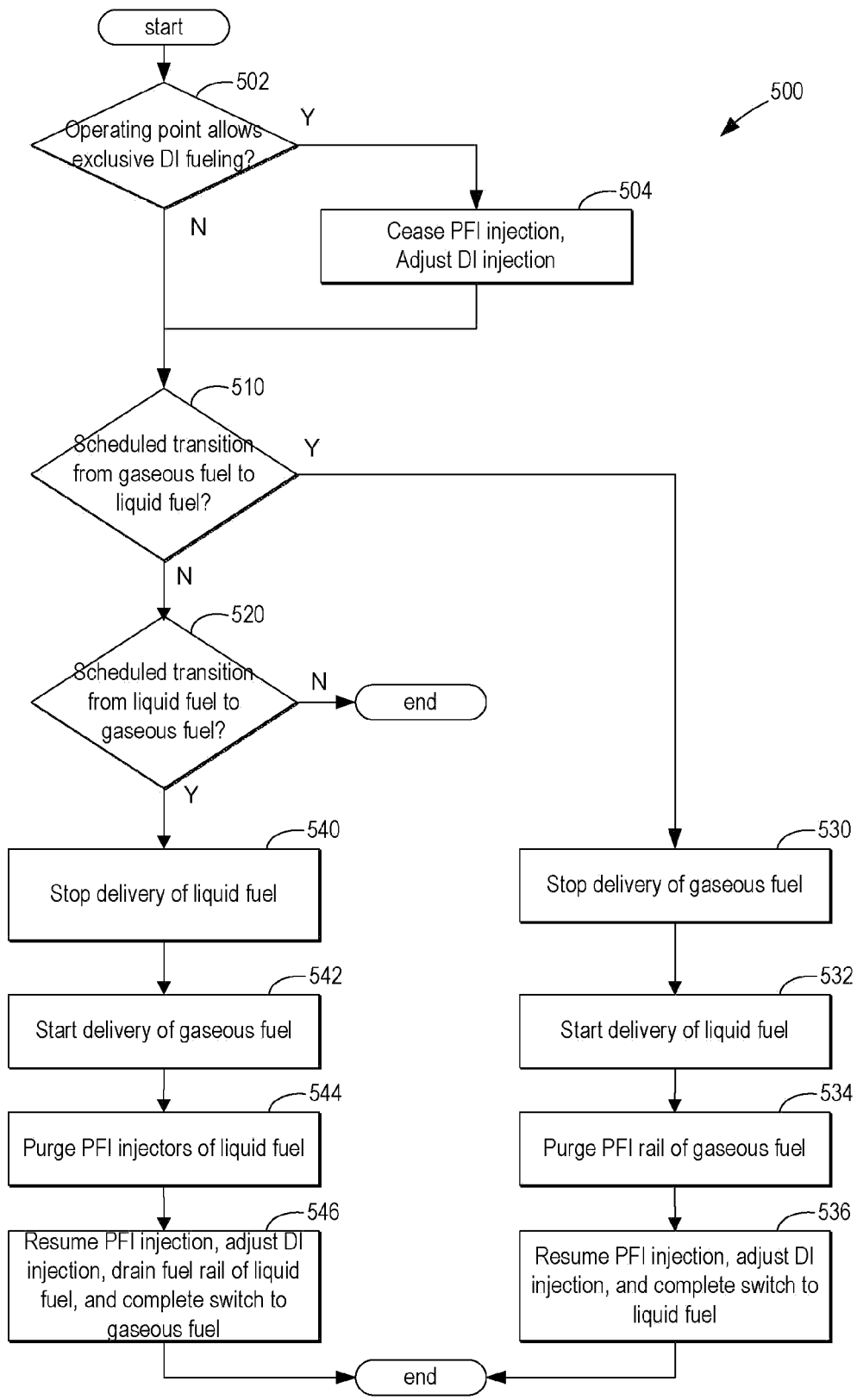
FIG. 5 shows a high level flow chart for transitioning a fuel delivery system from liquid fuel to gaseous fuel and from gaseous fuel to liquid fuel.

The following description relates to systems and methods for controlling an engine mounted in a vehicle travelling on a surface, the engine capable of operating with gaseous fuel and liquid fuel, injected separately and/or concurrently into the combustion chamber. For example, the engine (such as the one illustrated in FIG. 1) may include a first, direct, injector that directly injects liquid fuel into the combustion chamber and a second injector that injects fuel into the intake passage leading to the cylinder, where the intake nozzle of the second injector faces at least partially toward the surface. The gaseous and liquid fuel may be delivered by a fuel delivery system comprising a single fuel rail, such as illustrated in FIG. 2, or the fuel may be delivered by a fuel delivery system comprising a liquid fuel rail and a gaseous fuel rail as illustrated in FIG. 3. Further, the engine may include a control system with a routine to control the fuel delivery system such as illustrated in FIGS. 4-5. In one particular example, the routine includes delivering liquid fuel to the first injector, selectively delivering one of liquid fuel and gaseous fuel to the second injector depending on engine operating conditions, and adjusting injection of the first injector when transitioning the second injector from liquid fuel to gaseous fuel and when transitioning the second injector from gaseous fuel to liquid fuel.

Figure 1:
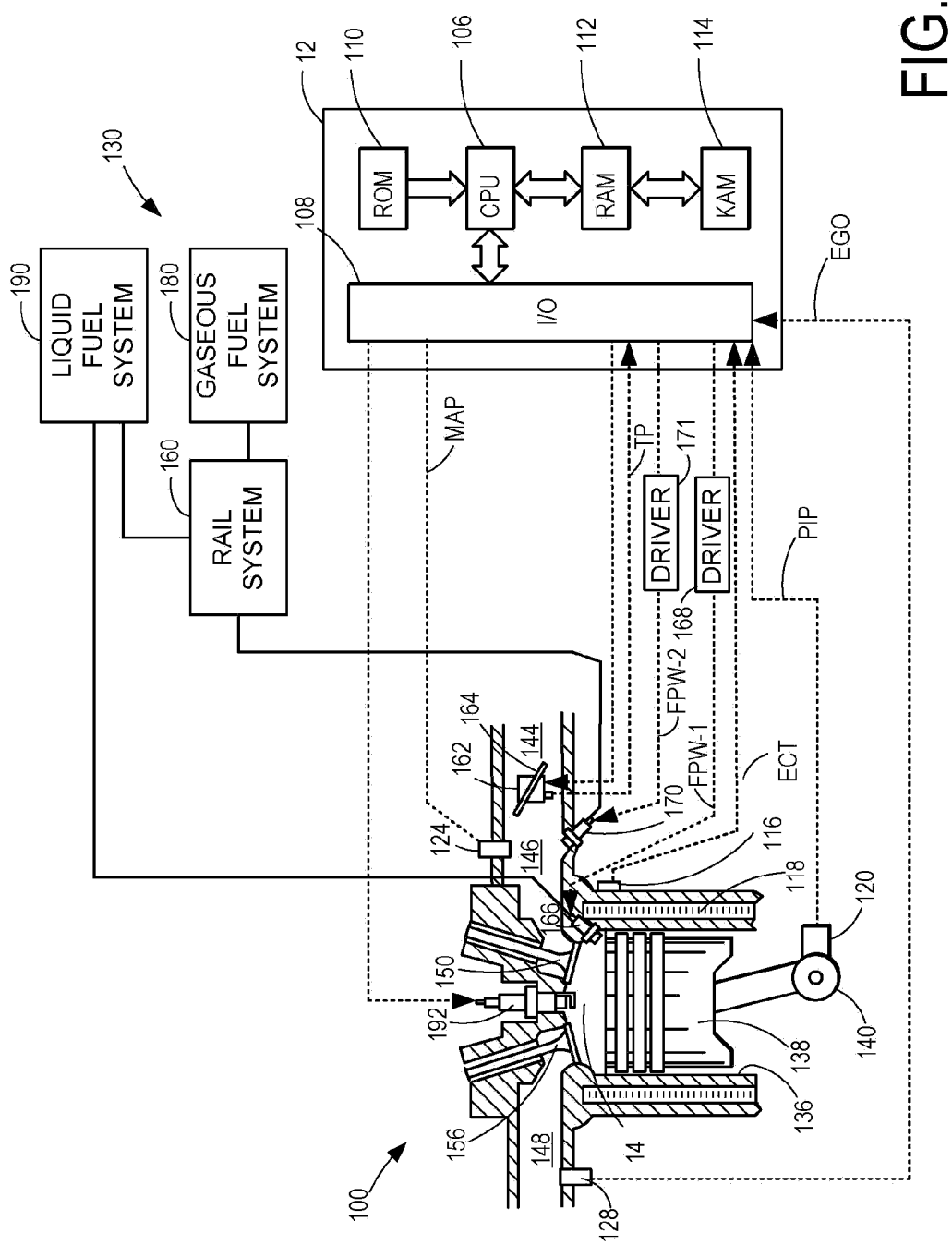
FIG. 1 depicts an example embodiment of one cylinder of an internal combustion engine in a system for a vehicle.

FIG. 1 depicts an example embodiment of a combustion chamber or cylinder of internal combustion engine 100. Engine 100 may be controlled at least partially by a control system including controller 12. Cylindrical combustion chamber (cylinder) 14 of engine 100 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 100.

Cylinder 14 can receive intake air via a series of intake air passages 144 and 146. Intake air passage 146 can communicate with other cylinders of engine 100 in addition to cylinder 14. In some embodiments, one or more of the intake passages may include a boosting device such as a turbocharger or a supercharger. A throttle 162 including a throttle plate 164 may be provided along an intake passage of the engine for varying the flow rate and/or pressure of intake air provided to the engine cylinders. Exhaust passage 148 can receive exhaust gases from other cylinders of engine 100 in addition to cylinder 14. Exhaust gas sensor 128 is shown coupled to exhaust passage 148. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. An emission control device (not shown) such as a catalytic converter with a temperature sensor may be downstream in exhaust passage 148.

Each cylinder of engine 100 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 100, including cylinder 14, may include at least two intake poppet valves and at least two exhaust poppet valves located at an upper region of the cylinder. In some embodiments, each cylinder of engine 100 may include a spark plug 192 for initiating combustion. However, in some embodiments, spark plug 192 may be omitted, such as where engine 100 may initiate combustion by auto-ignition or by injection of fuel as may be the case with some diesel engines.

In some embodiments, each cylinder of engine 100 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (DI) of fuel into combustion cylinder 14. While FIG. 1 shows fuel injector 166 as a side injector, it may also be located overhead of the piston, such as near the position of spark plug 192. Fuel may be delivered to fuel injector 166 from liquid fuel supply system 190. As non-limiting examples, the liquid fuel may be diesel, gasoline, ethanol, or combinations thereof.

Fuel injector 170 is shown arranged in intake passage 146, rather than in cylinder 14, in a configuration that provides what is known as port injection of fuel (PFI) into the intake port upstream of cylinder 14. Fuel injector 170 is shown in one example orientation, generally upside down, on the bottom of air passage 146, such that the fuel injector inlet faces at least partially toward the road surface when mounted in a vehicle. In an alternate embodiment, fuel injector 170 may be mounted right-side up, on top of air passage 146, such that the fuel injector inlet faces at least partially away from the road surface when mounted in a vehicle. Fuel injector 170 may inject fuel in proportion to the pulse width of signal FPW-2 received from controller 12 via electronic driver 171. Fuel may be delivered to fuel injector 170 from fuel delivery system 130, comprising liquid fuel supply system 190, gaseous fuel supply system 180, and rail system 160. Fuel delivery system 130 may selectively deliver liquid fuel and gaseous fuel to fuel injector 170 as directed by controller 12. As non-limiting examples, the gaseous fuels may include vaporized liquid fuels, CNG, hydrogen, LPG, LNG, etc. or combinations thereof.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 100, in addition to those signals previously discussed, including measurement of inducted mass air flow (MAF) from mass air flow sensor 124; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor. Engine speed signal, RPM, may be generated by controller 12 from signal PIP.

As described above, FIG. 1 shows only one cylinder of a multi-cylinder engine. As such, each cylinder may similarly include its own set of intake/exhaust valves, fuel injector(s), spark plug, etc.

FIG. 2 shows an example embodiment of a fuel delivery system capable of selectively delivering liquid fuel and gaseous fuel via a single fuel rail to a plurality of fuel injectors of an internal combustion engine. Fuel delivery system 130 comprises gaseous fuel supply system 180, liquid fuel supply system 190, and rail system 160. Rail system 160 connects fuel delivery system 130 to injectors 170, where, as a non-limiting example, injectors 170a, 170b, 170c, and 170d may be delivering fuel to different cylinders of engine 100.

Gaseous fuel supply system 180 includes a gaseous fuel source, which in the example embodiment, includes gaseous fuel tank 240 and valve 210. Gaseous fuel tank 240 may be a pressurized gas fuel tank containing gaseous fuel at high pressure, where "high pressure" is a pressure greater than the pressure of liquid fuel as it enters rail system 160. Optional pressure sensor 244 may measure the pressure within gaseous fuel tank 240 and communicate the data to electronic control unit (ECU) 290 (which may be controller 12). Valve 210 is connected to gaseous fuel tank 240 by supply line 218 and to rail system 160 by supply line 208. Valve 210, controlled by ECU 290, controls the flow of gaseous fuel 242 from gaseous fuel tank 240 to rail system 160. In the example embodiment, valve 210 may include a solenoid valve and a check valve, where the orientation of the check valve allows flow from gaseous fuel tank 240 to rail system 160 and prevents flow from rail system 160 to gaseous fuel tank 240. In another example embodiment, valve 210 may omit the check valve and may only be a solenoid valve controlled by ECU 290. In another embodiment (not shown), gaseous fuel supply system 180 may supplied with different gaseous fuel sources, such as a source of vaporized liquid fuel.

Liquid fuel supply system 190 includes a liquid fuel source, valves 212 and 222, check valve 235, and pressure relief valve 236. In the example embodiment, the liquid fuel source includes liquid fuel tank 230 filled with liquid fuel 238, fuel sensor 233, and pump 232. Liquid fuel 238 may be drawn into pump 232 from inlet 234 and ejected into supply line 227. Pump 232 is controlled by ECU 290. An optional high-pressure pump, controlled by ECU 290, may be inserted downstream from pump 232 to increase the liquid fuel pressure entering rail system 160. Fuel sensor 233 may be a liquid level sensor, to detect the storage amount in the fuel tank 230 and to communicate the storage amount to ECU 290. Liquid fuel tank 230 may also include a vent for letting air or fuel vapor at atmospheric pressure flow into and out of the tank.

A one-way check valve 235 is present between the liquid fuel source and valves 212 and 222 to prevent liquid fuel from flowing back to the liquid fuel source when liquid fuel is being delivered to rail system 160. Pressure relief valve 236, connected between the liquid fuel source and valves 212 and 222, provides a return path for liquid fuel forced out of rail system 160. The threshold for pressure relief valve 236 to open may be greater than the pressure generated by the liquid fuel source and less than the minimum pressure for gaseous injection. Pressure relief valve 236 is closed when liquid fuel flows from the liquid fuel source to rail system 160. In the example embodiment, each of valves 212 and 222 comprises a float valve. The float valve contains a ball that floats in liquid fuel, but sinks in gaseous fuel. When the ball in the float valve sinks, it blocks the path through the valve, and the valve is closed. Liquid fuel may flow through the float valve, but gaseous fuel cannot flow through the float valve. In other embodiments, each of valves 212 and 222 may be a solenoid valve controlled by ECU 290. In another embodiment, valves 212 and 222 may be combined into a single valve feeding the fuel rail. In yet another embodiment, valves 212 and 222 may be check valves, a liquid fuel accumulator may be attached to rail system 160, and pressure relief valve 236 may be omitted.

Fuel injectors 170 may receive liquid fuel from liquid fuel supply system 190 and gaseous fuel from gaseous fuel supply system 180 via rail system 160. In FIG. 2, rail system 160 comprises fuel rail 204 with inlets for liquid fuel from supply lines 214 and 224, an inlet for gaseous fuel from supply line 208, and pressure sensor 205 for communicating pressure of the fuel rail to ECU 290. Engine 100 and fuel delivery system 130 are mounted in a vehicle such that the bottom of fuel rail 204 faces at least partially toward the surface the vehicle will travel on and the top of fuel rail 204 faces at least partially away from the surface, the surface pointed to by arrow 250. Fuel rails are often tube-like volumes and thus, depending on vehicle inclination, the fuel rail is preferred to have a drain on each end to better enable draining of liquid fuel from the fuel rail. Supply lines 214 and 224, acting as both inlets and drains for fuel rail 204, are located on the bottom of fuel rail 204 with the inlet for supply line 214 on the opposite end of the inlet for supply line 224. Supply line 208 connects the output of gaseous fuel supply system 180 to fuel rail 204. Pressure sensor 205 measures pressure within fuel rail 204 and communicates pressure data to ECU 290. Fuel injectors 170 are mounted on the top of fuel rail 204, such that the intake nozzles of the fuel injectors face at least partially toward the surface.

When fuel injectors 170 are injecting liquid fuel, pump 232 and optional high pressure pump are on, valves 212, 222, and 235 are open, and valves 236 and 210 are closed. Liquid fuel flows from liquid fuel tank 230 through supply lines 234, 227, 220, 214, and 224 into fuel rail 204. Fuel rail 204 is filled with pressurized liquid fuel which may be injected by fuel injector 170 in proportion to the pulse width of signal FPW-2 received from controller 12 via electronic driver 171.

When fuel injectors 170 are injecting gaseous fuel, pump 232 and the optional high pressure pump may be off, valves 212 and 222 are closed, and valve 210 is open. Gaseous fuel flows from gaseous fuel tank 240 through supply lines 218 and 208 into fuel rail 204. Fuel rail 204 is filled with pressurized gaseous fuel which may be injected by fuel injector 170 in proportion to the pulse width of signal FPW-2 received from controller 12 via electronic driver 171.

In order to transition from liquid fuel to gaseous fuel, fuel pump 232 and the optional fuel pump are disabled and valve 210 is opened. During the transition, fuel rail 204 may contain gaseous fuel 206 and liquid fuel 216 concurrently. High pressure gaseous fuel 206 flows into and rises to the top of fuel rail 204. The position and orientation of injectors 170, on top of fuel rail 204, speed the transition from liquid fuel to gaseous fuel because the rising gaseous fuel is preferentially delivered to injectors 170. Injection of gaseous fuel by the fuel injector may begin even before the fuel rail is entirely purged of liquid fuel. Applying high pressure gaseous fuel forces liquid fuel 216 to flow from fuel rail 204 back to liquid fuel tank 230 through the path containing pressure relief valve 236. The transition is finished when gaseous fuel reaches float valves 212 and 222. Float valves 212 and 222 seal when they are drained of liquid fuel, preventing gaseous fuel from entering liquid fuel supply system 190.

To transition from gaseous fuel to liquid fuel, valve 210 is closed and fuel pump 232 and optional fuel pump are turned on. The remaining gaseous fuel 206 in fuel rail 204 is delivered to injectors 170 as liquid fuel 216 flows into fuel rail 204. The gaseous fuel 206 is purged from fuel rail 204 quickly because the fuel rail holds a small amount of gaseous fuel compared to liquid fuel. Additional details for transitioning the fuel injection of the engine are described below with regard to FIGS. 4-5.

FIG. 3 shows an alternative embodiment of fuel delivery system 130. In this embodiment, a given fuel injector is supplied with liquid fuel by a liquid fuel rail and supplied with gaseous fuel by a gaseous fuel rail. Fuel delivery system 130 comprises gaseous fuel supply system 180, liquid fuel supply system 190, and rail system 160, where gaseous fuel supply system 180 and liquid fuel supply system 190 are unchanged from FIG. 2.

Rail system 160 comprises liquid fuel rail 310, gaseous fuel rail 320, pressure sensors 312 and 322, outlet line 326, float valve 315, and check valve 350. Rail system 160 supplies liquid fuel and gaseous fuel to injector 170. Liquid fuel is delivered to injector 170 via liquid inlet 316 and gaseous fuel is delivered to injector 170 via gaseous inlet 352. Pressure sensors 312 and 322 measure the pressure in liquid fuel rail 310 and gaseous fuel rail 320 respectively. Optional check valve 350 prevents liquid fuel from entering gaseous fuel rail 320 when valve 210 is closed and/or when the pressure in gaseous fuel tank 240 is less than the pressure in liquid fuel rail 310. Optional float valve 315 prevents gaseous fuel from entering liquid fuel rail 310 when the pressure in liquid fuel rail 310 is less than the pressure in gaseous fuel rail 320.

When pressure in gaseous fuel rail 320 is greater than pressure in liquid fuel rail 310, fuel injector 170 will operate with gaseous fuel. When pressure in gaseous fuel rail 320 is less than pressure in liquid fuel rail 310, fuel injector 170 will operate with liquid fuel. Thus, either fuel rail may run out of pressure without disrupting the flow of fuel to fuel injector 170.

FIG. 4 illustrates a high-level flowchart for a routine 400 that may be executed by an engine controller, such as 12, to carry out a control method for fuel delivery system 130 (as shown in FIG. 2) coupled to engine 100 having a cylinder 14 with fuel injector 166 and fuel injector 170. In one example, the method includes, during a first set of selected conditions, operating in a first mode delivering liquid fuel to injector 166 and delivering liquid fuel to injector 170. During a second set of conditions, the second set different from the first set, the method includes operating in a second mode delivering liquid fuel to injector 166 and delivering gaseous fuel to injector 170. When transitioning injector 170 from liquid fuel to gaseous fuel and when transitioning injector 170 from gaseous fuel to liquid fuel, the injection rate of injector 166 may be adjusted.

Returning to routine 400, at 402, the method includes measuring and/or estimating the engine operating conditions. The conditions assessed may include gaseous fuel storage level, liquid fuel storage level, engine condition, such as starting up or shutting down, vehicle speed, engine speed, engine load, liquid fuel alcohol composition, barometric pressure, manifold pressure (MAP), air temperature, exhaust gas air/fuel ratio, catalyst temperature, etc.

At 404, the routine compares the operator requested mode to the current mode of fuel delivery system 130. For example, the operator may request only liquid fuel be used, or the operator may request that a combination of liquid fuel and gaseous fuel be used. If the operator requested mode is different than the current mode, then the routine proceeds to 450. If the operator requested mode matches the current mode, then the routine proceeds to 406.

At 406, the routine determines a desired mode for fuel delivery system 130. The desired mode may be based on boost level, fuel costs, catalyst protection, and/or any of the engine operating conditions measured and/or estimated at 402. Differing performance, emissions, and operating goals may indicate different desired fuel mixes. Thus, in one example, the routine determines the desired mode based on the competing goals. A priority encoder or a look-up table could be used, for example. As an example of competing operational goals, a lightly loaded engine may indicate the use of more gaseous fuel, but if pressure sensor 244 indicates there is no gaseous fuel, then liquid fuel may be used exclusively. Example conditions wherein the engine operates on liquid fuel exclusively may include one or more of the following conditions: when an operator requests liquid fuel, when gaseous fuel pressure is below a threshold, and when there is heavy engine loading. Example conditions where the engine operates on gaseous fuel and liquid fuel may include one or more of the following conditions: when the operator requests gaseous fuel and when liquid fuel storage level is below a threshold.

As another example, CNG may be less expensive than gasoline and CNG has a higher octane rating so CNG may be preferentially injected. The high octane rating of CNG (130 RON) reduces the possibility of the engine knocking, but CNG may not be able to provide the full power requested by an operator such as in a wide-open throttle condition. When the engine requires high power, the desired fuel mixture may be liquid fuel exclusively, or a combination of gaseous and liquid fuel, for example. The routine proceeds to 410 from 406.

At 410, the routine determines if the current mode of the fuel delivery system is such that gaseous fuel is flowing to port fuel injector 170 and liquid fuel is flowing to direct injector 166. If true, the routine continues to 430. If false, the routine continues to 412, where the routine determines if the current mode of the fuel delivery system is such that liquid fuel is flowing to port fuel injector 170 and liquid fuel is flowing to direct injector 166. If true, the routine continues to 420. If false, the routine exits.

At 420, the routine determines if the conditions for knock are present, which may include determining if knock is indicated by a knock sensor, for example. If knocking conditions are detected, the routine proceeds to 422 where the injection rate of liquid fuel may be increased for direct injector 166 and the injection rate may be decreased for port fuel injector 170. By directly injecting into the cylinder, the heat of vaporization may be used to reduce or eliminate the knocking conditions. If knocking conditions are not present, the current levels of fueling are maintained and the routine continues to 440.

At 424, the routine determines if the injection rate of direct injector 166 is at or above a threshold for direct injector 166. If false, the routine proceeds to 440. If true, the routine proceeds to 426.

At 426, the routine changes the desired mode of the fuel delivery system such that gaseous fuel is delivered to port fuel injector 170 and liquid fuel is delivered to direct injector 166. The routine continues to 440.

At 430, the routine determines if the power generated by the engine is less than the power requested. If the engine power is sufficient, at 438, the injection rate of gaseous fuel may be increased for port fuel injector 170 and the injection rate of liquid fuel for direct injector 166 may be decreased. The routine proceeds from 438 to 440. Returning to 430, if the engine power is not sufficient, e.g. power limited, the routine proceeds to 432 where the injection rate of liquid fuel may be increased for direct injector 166 and the injection rate of gaseous fuel may be decreased for port fuel injector 170. The routine proceeds from 432 to 434.

At 434, the routine determines if the injection rate of direct injector 166 is at or above a threshold for direct injector 166. If false, the routine proceeds to 440. If true, the routine proceeds to 436.

At 436, the routine changes the desired mode of the fuel delivery system such that liquid fuel is delivered to port fuel injector 170 and liquid fuel is delivered to direct injector 166. The routine continues to 440.

At 440, the routine determines if the desired mode of the fuel delivery system is the same as the current mode of the fuel delivery system. If true, the routine proceeds to 460 where the operating mode is maintained and then the routine is exited. If false, the routine continues to 450.

At 450, the mode of the fuel delivery system is scheduled for transition from liquid fuel to gaseous fuel or from gaseous fuel to liquid fuel. During the mode transition, control passes from 450 to routine 500. After the mode transition, control passes back to routine 450. The operating mode and current mode are updated and then the routine exits. It will be appreciated that routine 500 may be a sub-routine or a set of steps coded in-line with routine 400.

FIG. 5 illustrates a high-level flowchart for a routine 500 that controls fuel delivery system 130 during a transition of port fuel injector 170 from liquid fuel to gaseous fuel or from gaseous fuel to liquid fuel.

At 502, the routine determines if the engine operating conditions are allowable for port fuel injector 170 to stop injecting fuel. If false, the routine proceeds to 510. If true, the routine proceeds to 504 where injections by port fuel injector 170 are stopped (by controlling the FPW-2 signal) and injections by direct injector 166 are increased (by controlling the FPW-1 signal). In one example, the routine ceases injections by port fuel injector 170 during the fuel transition to reduce transient conditions on the fuel rail where the injector may receive a mix of gaseous and liquid fuel and/or when different injectors receive different mixes of fuel. By increasing injection of direct injector 166 when ceasing injection on port fuel injector 170, the amount of power generated by engine 100 may be maintained entering the transition. As such, an example engine operating condition checked in 502 is whether direct injector 166 may inject enough additional fuel to make up for the missing fuel injected by port fuel injector 170 to maintain engine power entering the transition.

At 510, the routine determines if the scheduled transition on port fuel injector 170 is from gaseous fuel to liquid fuel. If true, the routine proceeds to 530. If false, the routine proceeds to 520 where the routine determines if the scheduled transition on port fuel injector 170 is from liquid fuel to gaseous fuel. If true, the routine proceeds to 540. If false, the routine exits.

At 540, the routine begins the transition from delivering liquid fuel to delivering gaseous fuel to port fuel injector 170 by stopping delivery of liquid fuel from the liquid fuel source. In the example embodiment, liquid fuel pump 232 and the optional fuel pump are disabled. Next, at 542, the delivery of gaseous fuel is started by opening fuel valve 210 so that high pressure gaseous fuel may begin to fill the fuel rail and/or fuel injector 170. Applying the high pressure gaseous fuel will push the liquid fuel past the float valves and out of the fuel rail, but a small amount of liquid fuel may be trapped in the injector. At 544, port fuel injector 170 may be purged of remaining liquid fuel by injecting small amounts of fuel through port fuel injector 170. Purging the liquid fuel from port fuel injector 170 can happen quickly because the intake nozzles of the injectors, mounted on the top of the fuel rail, face at least partially toward the surface. This configuration enables gaseous fuel to rise to the injectors and to be preferentially injected. Injection of gaseous fuel by port fuel injector 170 may begin, at 546, even before the fuel rail is entirely purged of liquid fuel. The high pressure gaseous fuel will eventually push all of the liquid fuel out of the fuel rail. If port fuel injection ceased and direct injection increased in 504, direct injection may be adjusted. Decreasing injection of direct injector 166 when resuming injection on port fuel injector 170 may enable the power generated by the engine to be maintained exiting the transition. The transition to gaseous fuel may further include updating variables and states associated with fuel type to the gaseous values. For example, the pulse width of the FPW-2 signal may differ for liquid fuel and gaseous fuel. As another example, the injection rate of direct injector 166 may differ when port fuel injector 170 is injecting gaseous fuel or liquid fuel. When all states have been updated, the routine may exit.

At 530, the routine begins the transition from delivering gaseous fuel to delivering liquid fuel to port fuel injector 170 by stopping the delivery of gaseous fuel. In the example embodiment, valve 210 is closed so that high pressure gaseous fuel is blocked from entering the fuel rail. Next, at 532, the delivery of liquid fuel is started by turning on liquid fuel pump 232 and the optional fuel pump so that liquid fuel may be delivered to the fuel rail. At 534, port fuel injector 170 and the fuel rail are purged of remaining gaseous fuel by injecting smaller amounts of fuel through port fuel injector 170. The routine may monitor the pressure in fuel rail 204 to determine when all gaseous fuel has been purged from fuel rail 204.

When a sufficient amount of gaseous fuel is expunged, opening and closing fuel injector 170 may cause pressure pulsations in the fuel rail. If some gaseous fuel is present in fuel rail 204, opening and closing fuel injector 170 may not cause pressure pulsations in the fuel rail. In the example embodiment, pressure sensor 205 may be used to measure the pressure in fuel rail 204. When a sufficient amount of gaseous fuel has been purged from the fuel rail, at 536, injection of liquid fuel by port fuel injector 170 may be resumed. If port fuel injection ceased and direct injection increased in 504, direct injection may be adjusted. Decreasing injection of direct injector 166 when resuming injection on port fuel injector 170 may enable the power generated by the engine to be maintained exiting the transition. The transition to liquid fuel may further include updating variables and states associated with fuel type to the liquid values. When all state has been updated, the routine may exit.

In this way, it is possible to transition an injector of a cylinder from liquid to gaseous fuel, or vice versa, by selective adjustment of another injector coupled to the cylinder.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be encoded as microprocessor instructions and stored into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of controlling an engine cylinder, comprising:
    delivering liquid fuel to a first, direct, injector of the cylinder;
    delivering gaseous fuel to the second, port, injector of the cylinder; and
    transitioning the second injector from gaseous fuel to liquid fuel responsive to an injection rate of first injector being above a threshold.

2. The method of claim 1, wherein transitioning is further responsive to generated engine power being less than requested.

3. The method of claim 1, wherein transitioning is further responsive to an increase in fuel delivered to the second injection due to generated engine power being less than requested.

4. The method of claim 1, wherein delivering gaseous fuel to the second injector includes supplying gaseous fuel to an inlet of the second injector, the inlet facing at least partially toward a road surface on which a vehicle including the engine travels.

5. The method of claim 1, further comprising adjusting injection of the first injector when transitioning the second injector from liquid fuel to gaseous fuel.

6. The method of claim 1, wherein the adjusting injection of the first injector when transitioning the second injector from liquid fuel to gaseous fuel includes increasing injection of the first injector when ceasing injection on the second injector, such that the amount of power generated by the engine is maintained in the transition.

7. The method of claim 6, wherein the adjusting injection of the first injector when transitioning the second injector from liquid fuel to gaseous fuel includes decreasing injection of the first injector when resuming injection on the second injector, such that the amount of power generated by the engine is maintained in the transition.

8. The method of claim 1, further comprising:
    adjusting injection of the first injector and the second injector in response to knock.

9. A method of controlling an engine cylinder, comprising:
    delivering liquid fuel to a first, direct, injector of the cylinder;
    delivering liquid fuel to the second, port, injector of the cylinder; and
    transitioning the second injector from liquid fuel to gaseous fuel responsive to an injection rate of first injector being above a threshold.

10. The method of claim 9, wherein transitioning is further responsive to engine knock.

11. The method of claim 9, wherein transitioning is further responsive to an increase in fuel delivered to the second injector due to engine knock.

12. The method of claim 9 wherein delivering gaseous fuel to the second injector includes supplying gaseous fuel to an inlet of the second injector, the inlet facing at least partially toward a road surface on which a vehicle including the engine travels.

13. The method of claim 9 further comprising:
    adjusting injection of the first injector when transitioning the second injector from gaseous fuel to liquid fuel.

14. The method of claim 9, wherein the adjusting injection of the first injector when transitioning the second injector from gaseous fuel to liquid fuel includes increasing injection of the first injector when ceasing injection on the second injector, such that the amount of power generated by the engine is maintained in the transition.

15. The method of claim 14, wherein the adjusting injection of the first injector when transitioning the second injector from gaseous fuel to liquid fuel includes decreasing injection of the first injector when resuming injection on the second injector, such that the amount of power generated by the engine is maintained in the transition.

16. The method of claim 9, further comprising:
    adjusting injection of the first injector and the second injector in response to knock.

17. A method of controlling an engine cylinder, comprising:
    delivering liquid fuel to the cylinder's direct injector;
    selectively delivering gaseous and liquid fuel to the cylinder's port injector;
    transitioning the second injector from gaseous to liquid fuel responsive to the first injector reaching a maximum injection rate and insufficient engine power; and
    transitioning the second injector from liquid to gaseous fuel responsive to the first injector reaching the maximum injection rate and engine knock.

* * * * *